United States Patent
Muller

(10) Patent No.: US 9,852,763 B2
(45) Date of Patent: *Dec. 26, 2017

(54) VIDEO COMPILATION GREETING SYSTEM AND METHOD

(71) Applicant: Salutations 365 LLC, Overland Park, KS (US)

(72) Inventor: Matthew D. Muller, Overland Park, KS (US)

(73) Assignee: Salutations 365 LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/266,126

(22) Filed: Sep. 15, 2016

(65) Prior Publication Data

US 2017/0004860 A1    Jan. 5, 2017

Related U.S. Application Data

(63) Continuation of application No. 14/323,182, filed on Jul. 3, 2014, now Pat. No. 9,449,645.

(60) Provisional application No. 61/842,510, filed on Jul. 3, 2013.

(51) Int. Cl.
*G11B 27/031* (2006.01)
*H04N 21/2743* (2011.01)
*H04N 21/81* (2011.01)
*H04N 21/472* (2011.01)

(52) U.S. Cl.
CPC ....... *G11B 27/031* (2013.01); *H04N 21/2743* (2013.01); *H04N 21/47205* (2013.01); *H04N 21/8193* (2013.01)

(58) Field of Classification Search
CPC ............. G11B 27/031; H04N 21/2743; H04N 21/8193; H04N 21/47205
See application file for complete search history.

(56) References Cited

U.S. PATENT DOCUMENTS

| 2003/0167176 A1* | 9/2003 | Knudson | H04N 7/186 709/204 |
|---|---|---|---|
| 2006/0026000 A1 | 2/2006 | Bodin et al. | |
| 2007/0094328 A1 | 4/2007 | Birch | |
| 2009/0132371 A1* | 5/2009 | Strietzel | G06Q 30/02 705/14.46 |
| 2010/0082768 A1 | 4/2010 | Edwards et al. | |

(Continued)

FOREIGN PATENT DOCUMENTS

EP    1376582    1/2004

*Primary Examiner* — Hung Dang
*Assistant Examiner* — Sunghyoun Park
(74) *Attorney, Agent, or Firm* — Law Office of Mark Brown, LLC; Christopher M. DeBacker

(57) ABSTRACT

A video compilation greeting system which allows a number of collaborators to provide video segments for use in a combined video greeting or presentation. The video is submitted by the individual invitee collaborators and is automatically reformatted by the system into the desired format. The original organizer, who may optionally also be a collaborator, has several options for further customizing the final video product, such as adding credits or personalized messages at the end of the main feature, or titles and graphics to the beginning of the video. The final result is a video greeting to a recipient comprising multiple video submissions into a single video output.

13 Claims, 11 Drawing Sheets

(56) References Cited

U.S. PATENT DOCUMENTS

2010/0248759 A1\* 9/2010 Bettis ................... H04L 47/10
                                                     455/466
2010/0332404 A1\* 12/2010 Valin ................. G06Q 30/0239
                                                     705/310
2014/0372517 A1   12/2014 Zuili et al.

\* cited by examiner

VIDEO COMPILATION GREETING SYSTEM AND METHOD

CROSS-REFERENCE TO RELATED APPLICATION

This application is a continuation of and claims priority in U.S. patent application Ser. No. 14/323,182, filed Jul. 3, 2014, now U.S. Pat. No. 9,449,645, issued Sep. 20, 2016, which claims priority in U.S. Provisional Patent Application Ser. No. 61/842,510, filed Jul. 3, 2013, all of which are incorporated herein by reference.

BACKGROUND OF THE INVENTION

1. Field of the Invention

The present invention relates generally to a system and method for creating a video compilation, and more specifically to a system for compiling a number of separate digital video recordings into a single video presentation of a digital video greeting.

2. Description of the Related Art

The history of sending loved ones personalized greetings is at least as old as the postage stamp. As technology has advanced, so has the way greetings are sent. What was once a paper card is now an electronic "e-card" which is sent through email or as a link in a text message.

Personalized greetings in the digital age allow a sender to contact a recipient with any sort of message imaginable. The ability to send other elements, such as hyperlinks to videos or photographs is also highly possible. It is also possible to produce a collaborative message by emailing or contacting a number of individuals who sign off on one greeting for one recipient (e.g., all of the grandkids sending a letter to their grandfather for his 80th birthday). However, there are currently limitations in such technology.

Present technology makes it very difficult to produce a collaborative video greeting or collaborative video presentation from a group of people. Either each individual would have to self-record their portion of the video and send it to a single editor, or the editor would have to provide the same device to each of the collaborators in turn. This may require the editor to travel to places around the world, or to pay for shipping of the recording device to several places far away at great costs.

Once the video data is assembled, the editor has to have knowledge of video editing software and spent countless hours patching the final product together. In the case where video data comes from several digital sources, the video data may not even be compatible.

Other similar examples in the application market include multiple video messaging applications, with Google Hangout being the most popular. Google Hangout allows the user to video conference up to ten people on various mobile and computer platforms. This is a live platform and all ten people must be in front of their computer at the same time. Coordinating that many people across many different times zones would be difficult.

What is needed is a one-stop source for recording a number of videos by a number of collaborators which will then instantly be transformed into a collaborative greeting or presentation from the entire group of collaborators to a single recipient.

Heretofore there has not been available a system or method for creating a video compilation with the advantages and features of the present invention.

SUMMARY OF THE INVENTION

The present invention generally provides a video compilation greeting system which allows a number of collaborators to provide video segments for use in a combined video greeting or presentation. The video is submitted by the individual collaborators and is automatically reformatted by the system into the desired format. The original organizer, who may optionally also be a collaborator, has several options for further customizing the final video product, such as adding credits or personalized messages at the end of the main feature, or titles and graphics to the beginning of the video.

BRIEF DESCRIPTION OF THE DRAWINGS

The drawings constitute a part of this specification and include exemplary embodiments of the present invention illustrating various objects and features thereof

DETAILED DESCRIPTION OF THE PREFERRED EMBODIMENTS

I. Introduction and Environment

Figure 1:
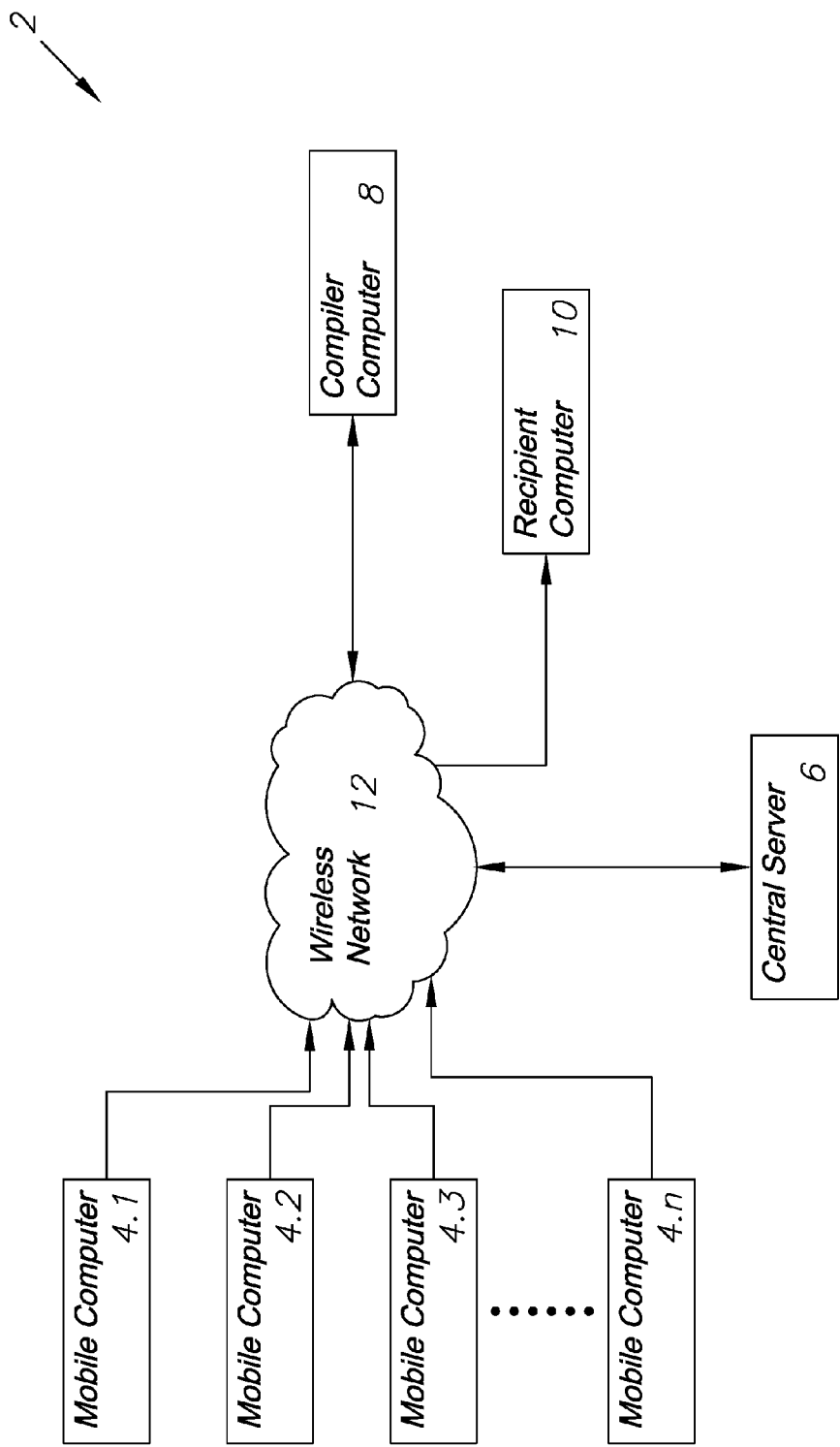
FIG. 1 is a diagrammatic view showing the relationship between components of an embodiment of the present invention.

As required, detailed aspects of the present invention are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Other terminology relating to mobile smart devices including a display device for viewing a typical web browser or user interface will be commonly referred to throughout the following description. The type of device, computer, display, or user interface may vary when practicing an embodiment of the present invention. Said terminology will include the words specifically mentioned, derivatives thereof and words of similar meaning.

The premise behind the present invention is to combine video recorded by a number of individuals (e.g., six) using their personal mobile devices (e.g., smart devices such as smart phones) into a single collaborative video greeting where video from each participant plays back simultaneously, creating a collaborative greeting or presentation. The videos are combined into a single video image instead of taxing the processing power of the play-back device by playing six separate video images simultaneously. This also ensures that the quality across each separate video portion is equivalent or nearly equivalent.

II. Preferred Embodiment Collaborative Video Greeting System 2

A preferred embodiment of the present invention provides a mobile device application, a video recording element, and a back-end server with software capable of splicing video segments together into a single video greeting or video presentation.

The preferred embodiment features a number of users to record up to six individual video recordings. Each user is invited to submit their individual video by a lead collaborator, who will also be the final editor. The lead collaborator may or may not be one of the users submitting video to the collaborative final product.

The lead collaborator sends an invitation to the various users using a software application loaded onto a mobile smart device, a personal computer, or some other device having computer processing and software storage means. The invitation would have constraints for the video, such as length of the video and the requested content. The invitation may also have a time constraint, requesting that all users submit their video by a certain day and time, or else the video collaboration will be sent without the input of a user who failed to meet the deadline.

Once all video submissions have been received, or the deadline has been reached, software located on a remote server will automatically combine the individual video submissions into a collaborative final result which may be electronically sent to a recipient.

Individual users and/or the lead collaborator may also be given the option to create a personalized message which would be tacked onto the end of the featured collaborative work. These personalized messages would be limited in time or scope, and would not necessarily have to follow the scope of the featured collaborative work. The lead collaborator may also opt to put graphics or a title in front of the collaborative work, and/or a list of participants or credits after the collaborative work.

Referring to the figures in more detail, FIG. 1 represents the relationship between the basic components of a video greeting system 2. The system includes at least a participant mobile computing device 4, a compiler computing device 8, a centralized server 6, a recipient computing device 10, and a wireless computer network 12. FIG. 1 shows a plurality of participant mobile computing devices 4.1, 4.2, 4.3 . . . 4.n, but the system 2 could be performed with any number of participant mobile computing devices.

Figure 2:
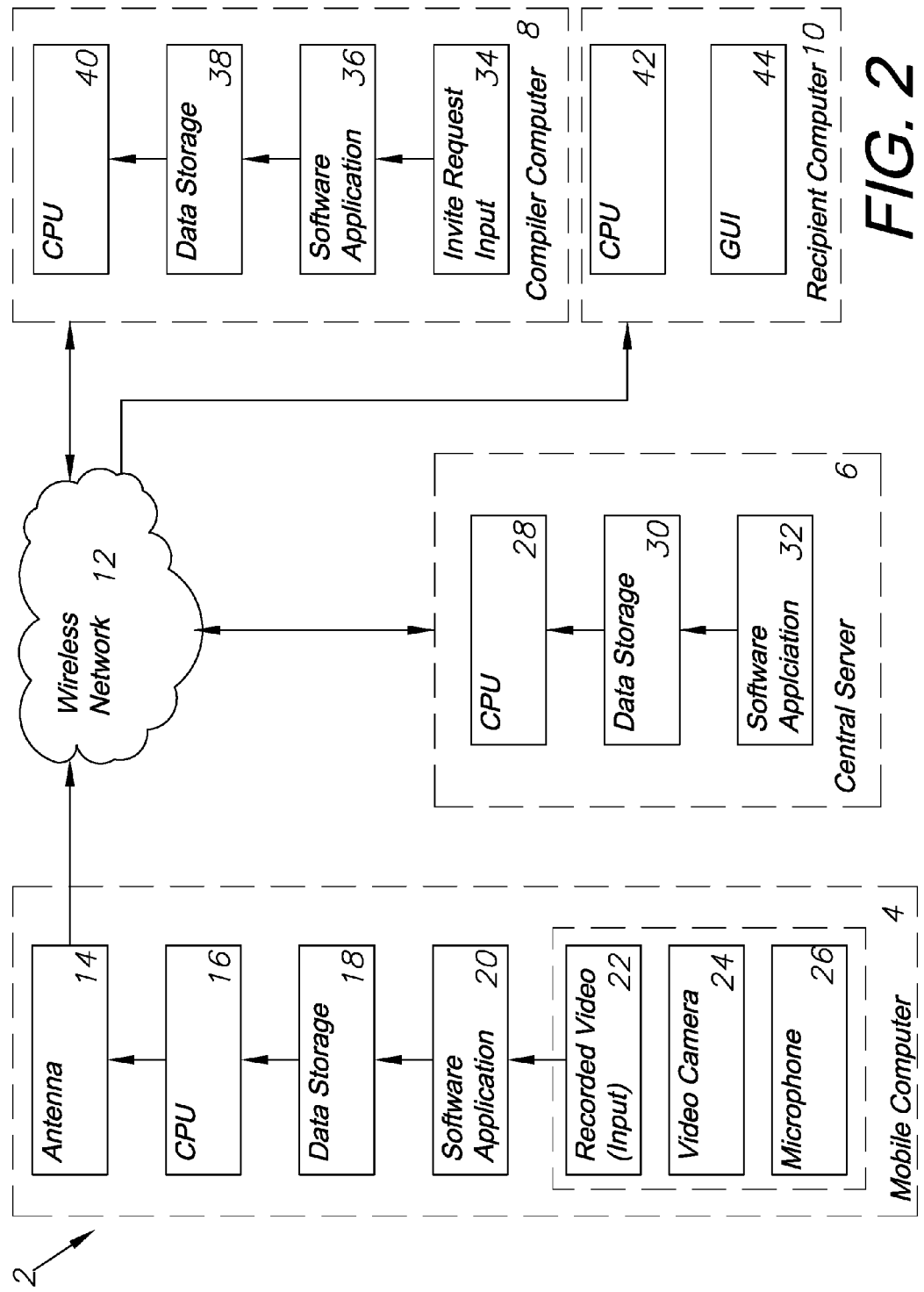
FIG. 2 is a diagrammatic view showing the relationship between components of an embodiment of the present invention.

FIG. 2 breaks the relationships between the components illustrated in FIG. 1 into more detail. The participant mobile computing device 4 includes a microphone 26 for recording audio inputs, and a video camera 24 for recording live video inputs. The audio and video inputs are compiled into a recorded video input 22, which is uploaded to a software application 20 associated with the video greeting system 2. The software application 20 is stored within data storage 18 within the mobile computer 4. A CPU 16 accesses stored data and the software application and generally controls the functions associated with the participant mobile computing device 4 as they pertain to the present invention. An antenna 14 allows the mobile computing device to communicate wirelessly through the wireless network 12, and to upload the recorded video input 22 to the central server 6 and/or to the compiler computer 8. Alternatively, the participant mobile computing device 4 could be hard-wired to a network which is capable of delivering the recorded video input 22. The mobile computing device 4 should also include a graphical user interface (GUI) (not shown).

The central server 8 includes at least a CPU 28, which accesses data stored within data storage 30, and application software 32 associated with the video greeting system 2. The central server's primary function is to allow users to download the software applications and to facilitate communications between the participants, the compilers, and the recipients.

The compiler computer 8 creates an invite request input 34 through a software application 36 stored on data storage 38 and accessed and controlled via a CPU 40. The compiler computer must also include some connection to the wireless network, either via an antenna (not shown) or a hardwired connection. Similarly, the compiler computer should include a GUI (not shown) suitable for reviewing and editing video. The compiler computer sends out the request input 34 through the wireless network 12 to the various participant mobile computing devices 4, and receives recorded video inputs 22 from the participants prior to having the final compiled video sent to the recipient.

The recipient computer 10 must include at least a CPU 42 for processing information received by the computer and a GUI 44 for viewing the compiled video greeting. The recipient computer 10 should not need any special software for viewing the video greeting other than video player software. Alternatively, the recipient may be invited to download a software application for free which allows viewing of the video greeting.

Figure 3:
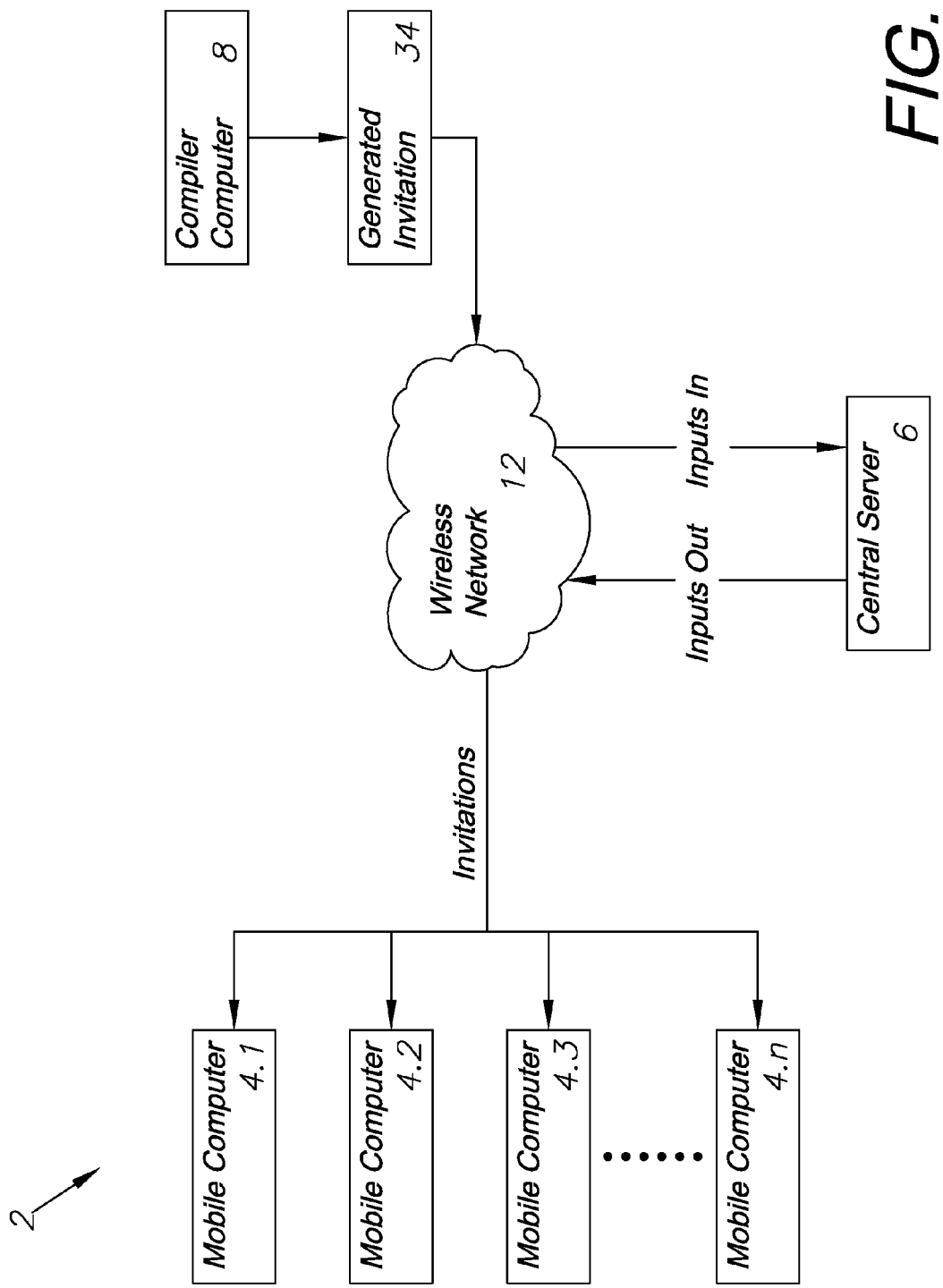
FIG. 3 is a diagrammatic view showing the relationship between components of an embodiment of the present invention.

FIG. 3 is another diagram showing the relationship between the participant mobile computers 4.1, 4.2, 4.3, . . . 4.n, the central server 6, and the compiler computer 8 through the wireless network 12. The compiler computer generates an invitation 34 which is sent to each mobile computer. Notifications are sent back to the compiler computer whether the participants accept or decline the invitation 34.

Figure 4:
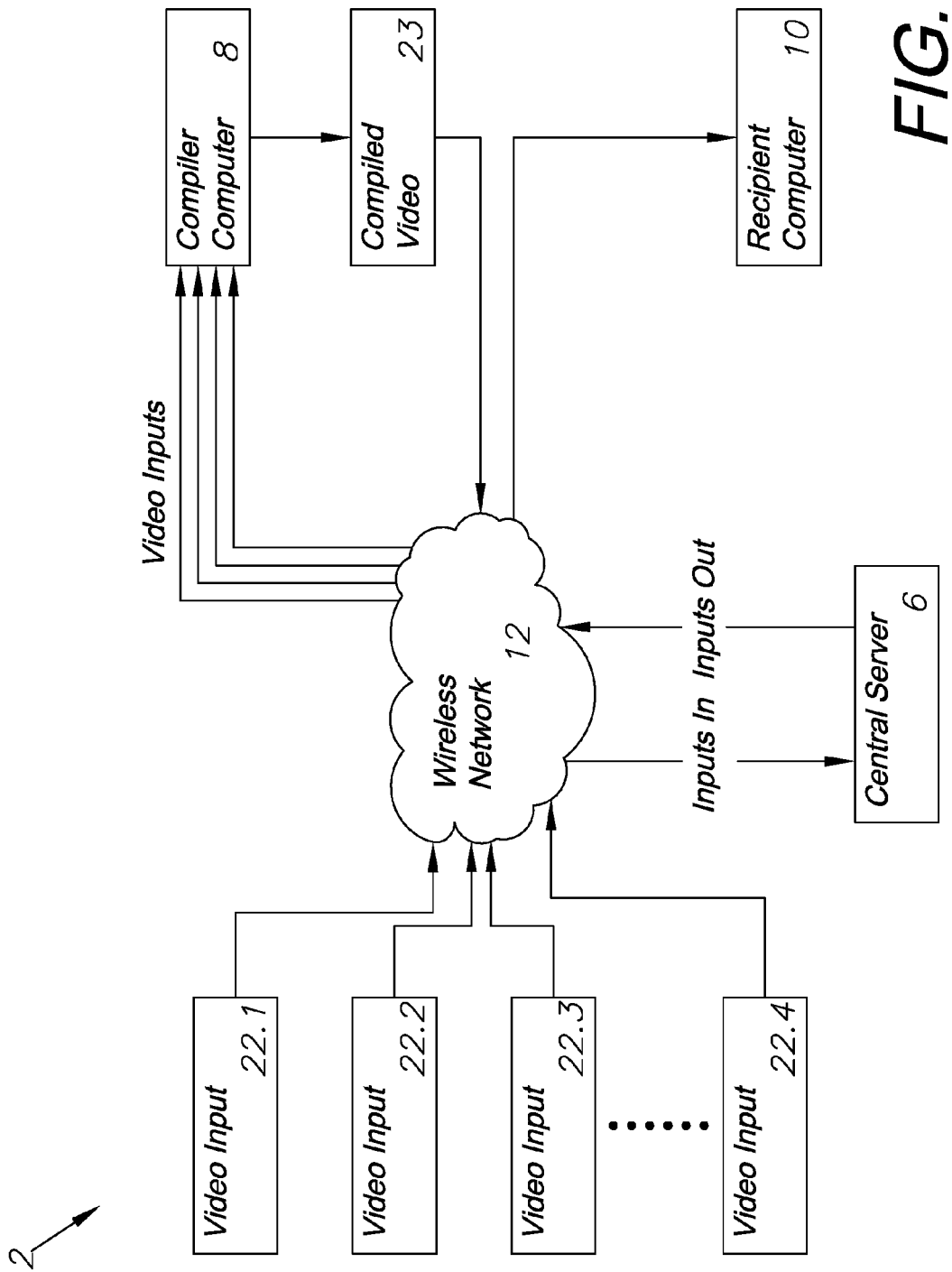
FIG. 4 is a diagrammatic view showing the relationship between components of an embodiment of the present invention.

FIG. 4 similarly shows the flow of recorded video inputs 22.1, 22.2, 22.3 . . . 22.n through the wireless network 12. The inputs flow from the mobile computing devices through the network and to the central server 6, where they may be stored or simply forwarded on to the compiler computer 8. The video inputs may be compiled using the central server CPU 28 or the computer CPU 40, but requires input from the compiler computer 8 either way. The compiled video 23 is completed through this process and through inputs at the compiler computer, is sent back through the wireless network where it is handled by the central server 6, and forwarded on to the recipient computing device 10 where it is viewable as a compiled video greeting.

Figure 5A:
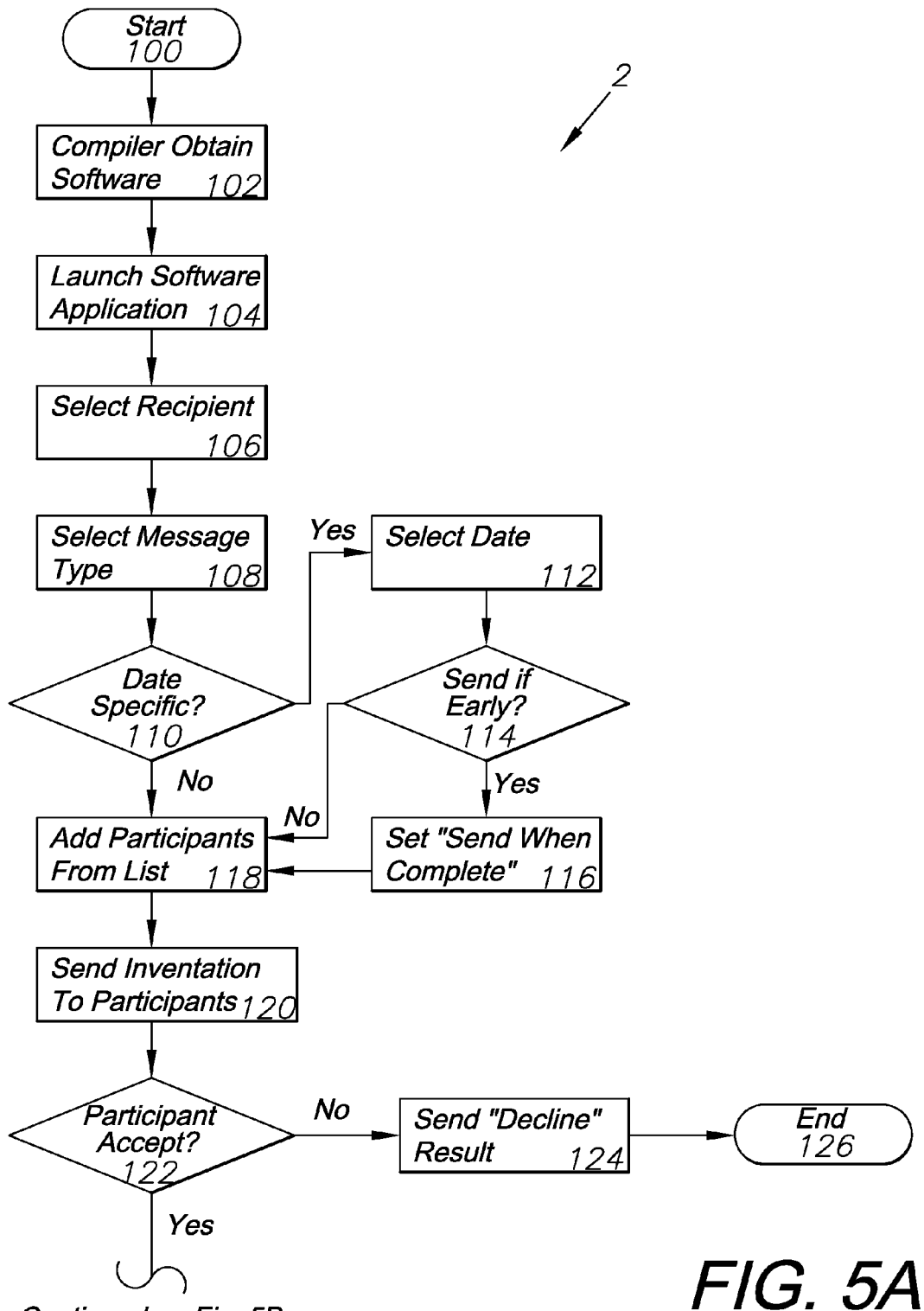
FIG. 5A is a flowchart diagramming the steps taken when performing an embodiment of the present invention.
Figure 5B:
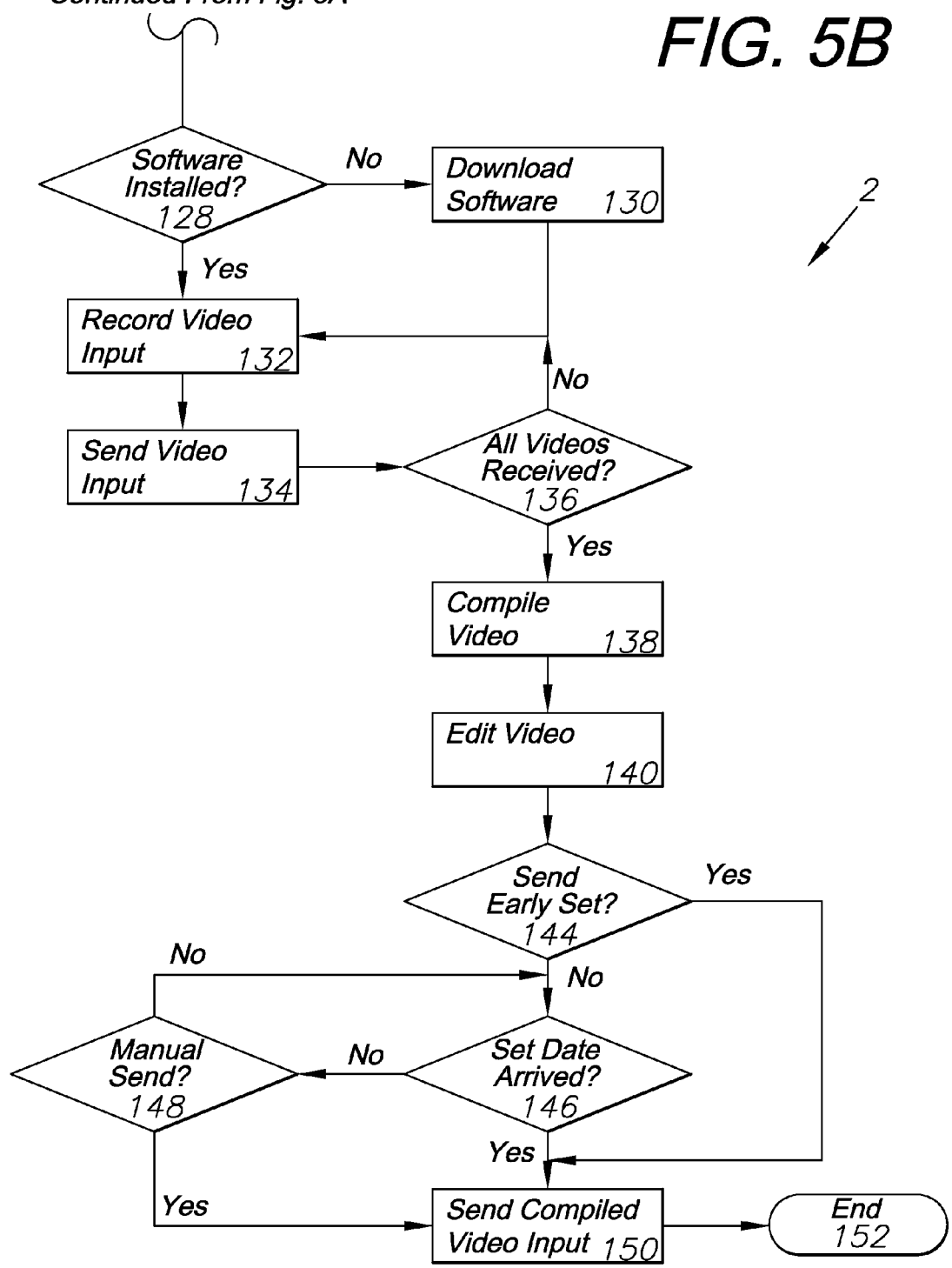
FIG. 5B is a continuation of the flowchart thereof.

FIGS. 5A and 5B demonstrate the steps taken by users when generating and sending a compiled video greeting to a recipient. The process starts at 100 and the compiler obtains the software application at 102. This requires the compiler to use the compiler computer to access the central server and download the relevant software application, where it is then downloaded and stored to the compiler computer data storage.

The software application 36 stored on the compiler computer is launched at 104 using the compiler computer CPU 40. The compiler will select any number of recipients at 106 from a database of recipients stored within the compiler computer data storage 38.

A message type is selected at 108. This may include any event such as "birthday greeting," "holiday greeting," or may not have any specific event tied to the greeting. The types of events that may be chosen from are limitless and could encompass any conceivable event.

Depending on what type of message is selected at 108, the event associated with that message may be date specific. A query is asked at 110 whether the event is date specific. If yes, a date for the event is selected at 112. An option to send the video greeting early if the participants have all uploaded their respective video segments at 114. If yes, then the "send when complete" option is set at 116. Otherwise, if the "send early" option is not set, or if the event is not date specific, the participants are added from a database of participants at 118. The database of participants is located and stored on the compiler computer data storage 38. Any number of participants may be selected to receive invitations.

The invitations to the participants are sent at 120. The participants then receive the option to accept or decline the invitation at 122. If the participants select to decline the invitation at 122, then the decline result is sent to the compiler computer at 124 and the process ends for that particular participant at 126.

Otherwise all participants who select to accept the invitation at 122 will then have their mobile computing device checked for whether the application software is installed at 128. If the software is not installed, the software is downloaded at 130. Once the software is installed, the participant records their respective recorded video input at 132 and the recorded video input is sent to the central server and/or the compiler computer at 134.

A check is performed at 136 either at the compiler computer or the central server to determine whether all videos had been received by the compiler computer and/or the central server. If no, then the remaining participants must record their video inputs at 132 and send those video inputs at 134. Optionally periodic alerts may be sent to participants to remind them to record and send their recorded video inputs.

Once all videos have been received and verified at 136, a compiled video greeting is generated at 138. The compiled video greeting may be edited by the compiler using the compiler computing device at 140.

A check is performed at 144 whether the "send early" setting was set at 116. If it had been set, the compiled video greeting is sent to the recipient at 150 and the process ends at 152.

If the "send early" setting was not set and that result is determined at 144, the system then checks to determine if the specific date associated with the event has arrived at 146. This includes a check of whether a date is necessary. If the date has arrived or if no date was needed or set at 146, the video is sent to the participant at 150 and the process ends at 152.

If the date has not arrived at 146, the compiler may be given the option to manually send the compiled video greeting at 148. The compiler may select this at any time up until the set date arrives. If the compiler chooses to manually send the video greeting at 148, the compiled video greeting is sent to the recipient at 150 and the process ends at 152.

Figure 6:
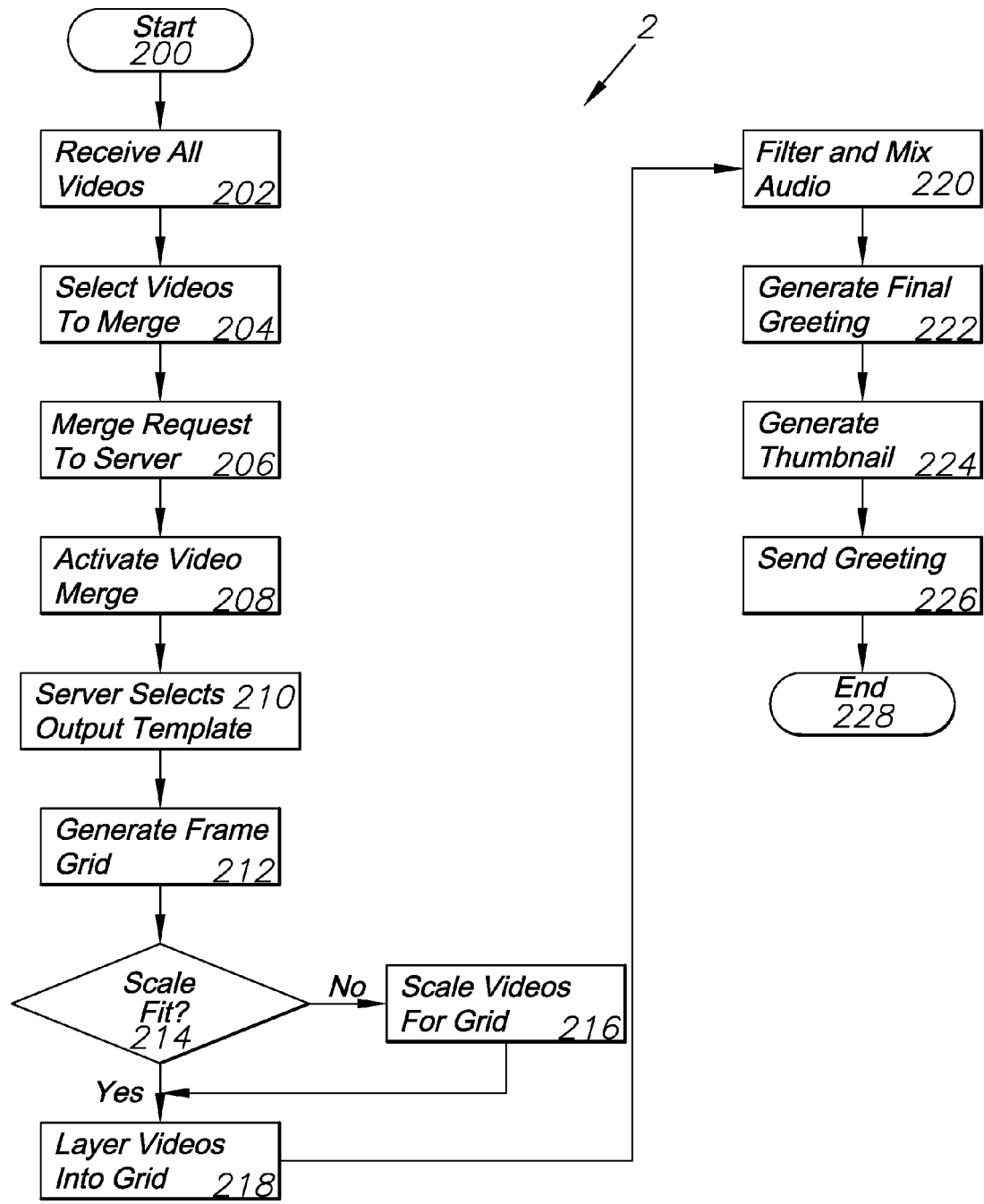
FIG. 6 is a diagrammatic view showing the relationship between components of an embodiment of the present invention.

FIG. 6 is a flowchart diagramming the video compilation process performed once the recorded video inputs 22 are received from the participants.

The process is rather linear, though checks may need to be performed via the various CPUs involved during the process. The process starts at 200 and all video submissions are received 202 at the central server 6 (or, alternatively, at the compiler computer 8). The compiler chooses which video submissions to merge together at 204. Note that this is an optional step that could involve choices performed by the CPU to weed out poor quality submissions. The merge api request is sent to the appropriate computer at 206, most likely the server.

The compiler then activates the software application to merge the video submissions at 208. At this point, the relevant CPU (e.g. central server CPU 28 or the compiler computer CPU 40) will determine the appropriate output template at 210. For example, if six video submissions were received, the output template may appear as the six-tiled format shown in FIG. 7. Alternatively, if only three video submissions are received, the output template would have larger video portions aligned linearly down the GUI of the recipient's device.

A frame grid associated with the output template is generated at 212. This is based on the above discussion regarding the number of submissions received.

The CPU must determine at 214 whether the scale of the video submissions will fit within the frame grid selected in the previous step. Most often this will be necessary, and the videos are scaled to fit the grid at 216 while maintaining their original aspect ratio. Otherwise (e.g. when only one video is sent) the videos are layered into the grid at 218. Here, a white canvas frame is created via FFmpeg, and each of the selected videos is layered upon their respective grid.

The various audio samples associated with each respective video submission must be filtered and mixed at 220. FFmpeg advanced filtering is capable of filtering the audio to similar volume and quality levels, and mixing that audio to a single track to correspond to the single video production. A final video greeting is generated at 222 from the layered video and the mixed audio, and a thumbnail is generated at 224 to identify that video greeting. The greeting is sent at 226, is viewed by the recipient, and the process ends at 228.

Figure 7:
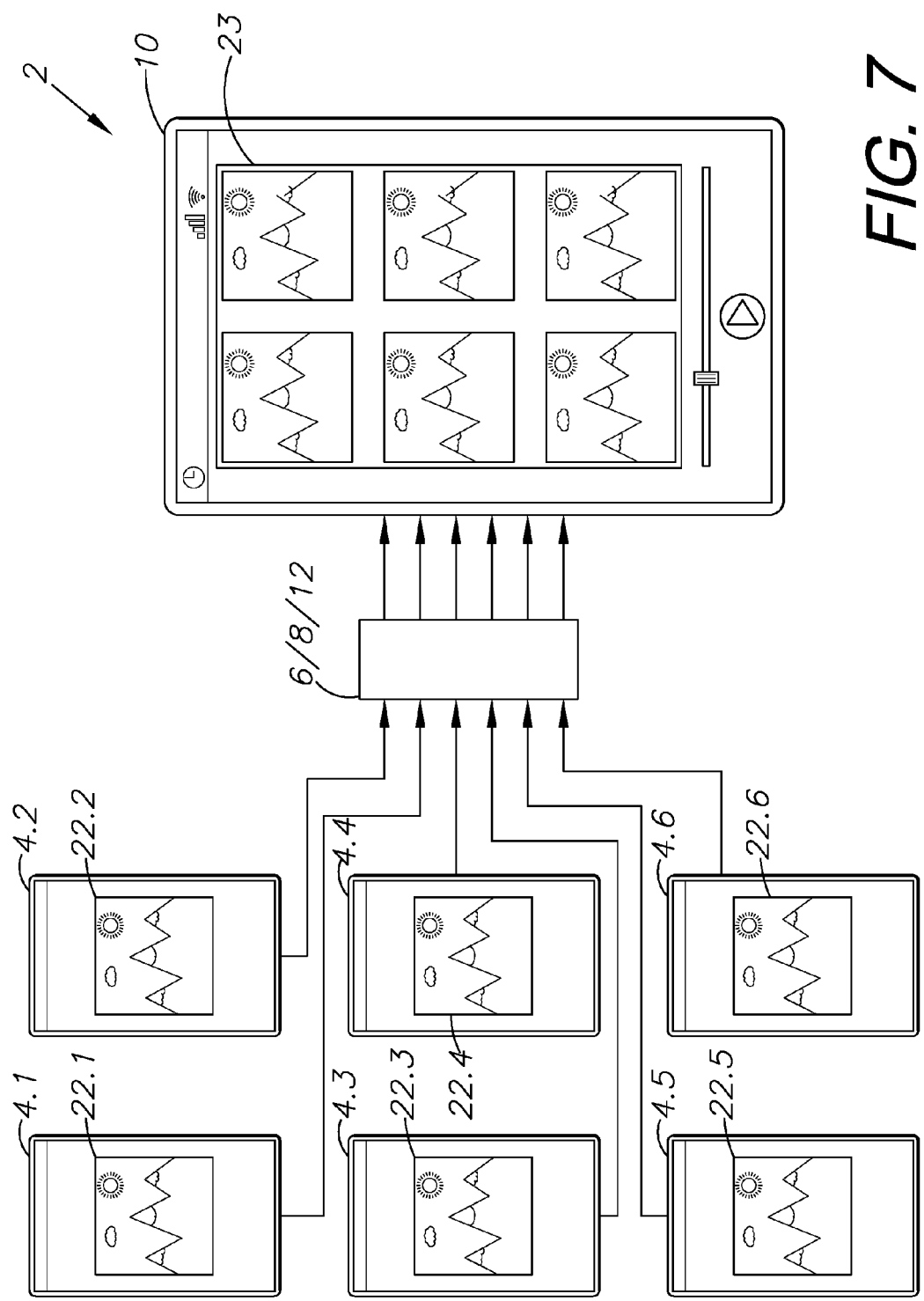
FIG. 7 is a flowchart diagramming the steps taken when performing a portion of an embodiment of the present invention.

FIG. 7 is a diagrammatic representation of how a number of participant mobile computing devices 4.1, 4.2, 4.3, 4.4, 4.5, and 4.6 would upload respective recorded video inputs 22.1, 22.2, 22.3, 22.4, 22.5, and 22.6 through the wireless network 12, central server 6, and compiler computer 8. A compiled video greeting 23 is created and sent to a recipient computing device 10. The compiled video greeting 23 includes each of the recorded video inputs 22.1, 22.2, 22.3, 22.4, 22.5, and 22.6. The various recorded video inputs are synched together such that recorded audio and video are shown simultaneously via the video greeting 23.

As summation, the present invention works as so: Person "A" initiates a video greeting for Recipient "B," and invites Invitees "C" and "D" to participate. "C" and "D" receive the invitation digitally via their mobile computers (e.g. smartphones) and choose to accept or decline the invitation. Upon accepting the invitation, "C," "D," and optionally "A" will record their video submissions (including audio) and upload those submissions to the centralized server 6. There, the videos are transcoded (e.g. into mp4 format), a new video entry is created, and the submissions are stitched together into the new video entry. It should be noted that any party may optionally be invited or decide to include multiple video entries. Once the final video entry is created from the independently submitted videos, the video is sent to the recipient "B."

Recipient "B" receives an email once the greeting is sent out which contains a link to a micro site. The micro site is hosted by the central server 6 and includes the completed video greeting message for the recipient. Alternatively, the actual video file may be sent electronically to the recipient. The Recipient may then choose to view each video submission separately, to more clearly understand and respond to each individual participant.

FFmpeg is chosen as the preferred framework for handling the audio and video data because it allows a single video production, including audio, to be produced quickly from multiple video and/or audio sources, while maintaining the original or near-original video and audio quality levels in the final product, without requiring additional processing resources from the recipient CPU when multiple videos are requested to be played simultaneously.

Figure 8B:
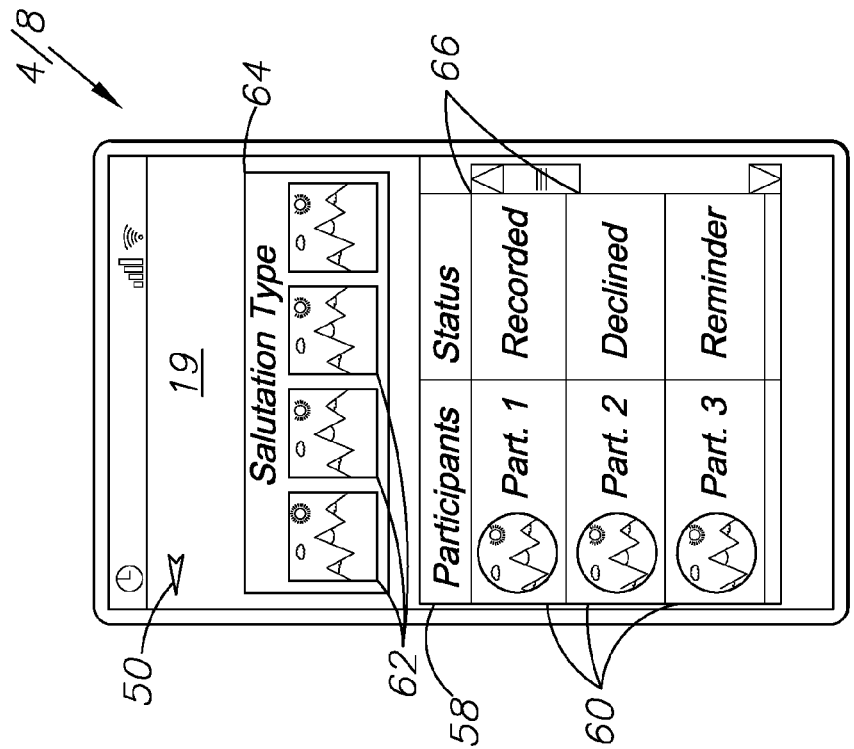
FIG. 8B is a diagrammatic representation of an example of a user interface associated with an embodiment of the present invention.
Figure 8A:
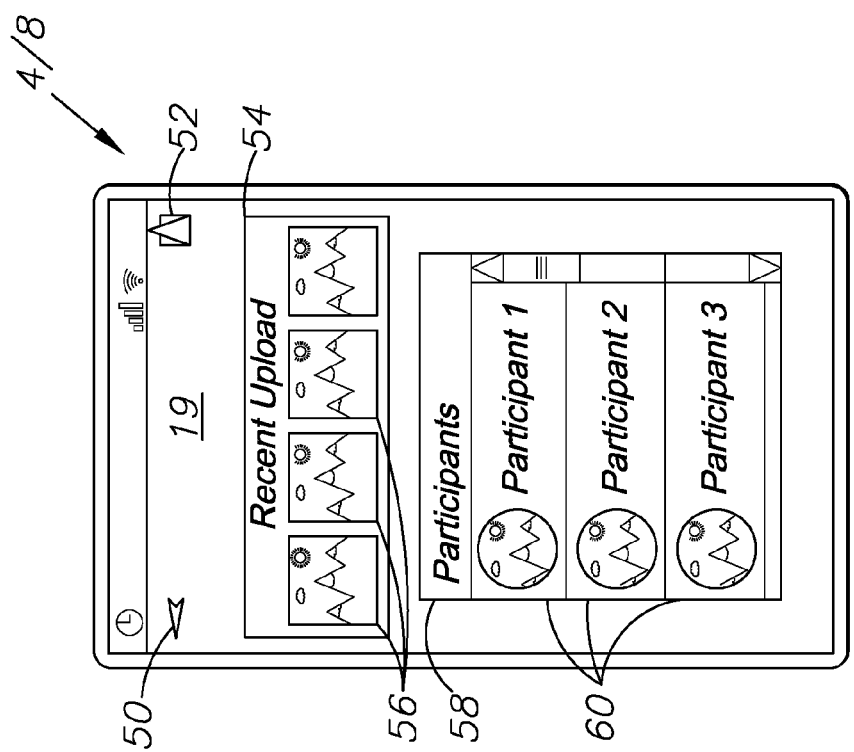
FIG. 8A is a diagrammatic representation of an example of a user interface associated with an embodiment of the present invention.

FIG. 8A is a diagrammatic representation of a user interface 19 associated with a participant mobile computing device 4. The user interface includes a selectable "go back" button 50 which changes the user interface 19 to a previous screen associated with a previous step in the process of generating a video greeting using a video greeting system 2. It should be noted that this view could also be seen on the compiler computing device 8.

A selectable "upload" button 52 allows the participant to upload recorded video. A "recent upload" window 54 is displayed which allows a user to select between multiple icons representing recently uploaded video recordings 22 or video greetings 23. A list of participants 58 to the selected recent upload 56 is displayed beneath the recent uploads, and each participant is indicated via a summary 60 including an icon representing each respective participant.

FIG. 8B is another diagrammatic representation of the user interface 19 associated with a participant mobile computing device 4 or a compiler computing device 8. The interface shown is similar to that of FIG. 8A, except that it is the screen received by a user who has received an invitation or by the compiler. The participants 58 are listed with icons 60, but also feature statuses 66, such as "recorded," "declined," or "reminder." These statuses let other participants and the compiler know how close the video greeting is to completion.

The type of greeting or "salutation" type is shown in the box labeled 64, and includes thumbnail images 62 associated with the participants.

Figure 8D:
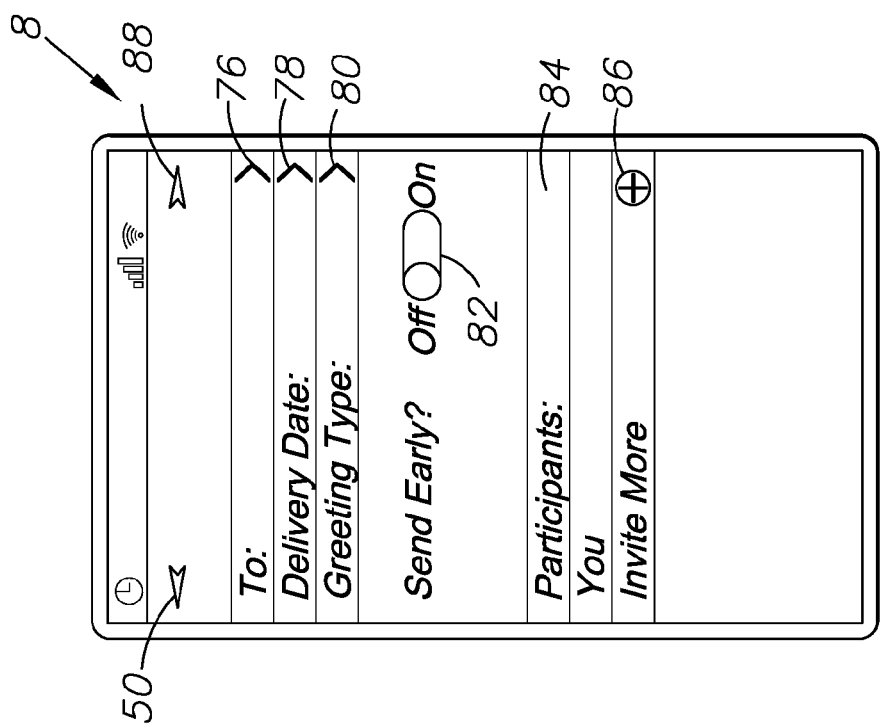
FIG. 8D is a diagrammatic representation of an example of a user interface associated with an embodiment of the present invention.
Figure 8C:
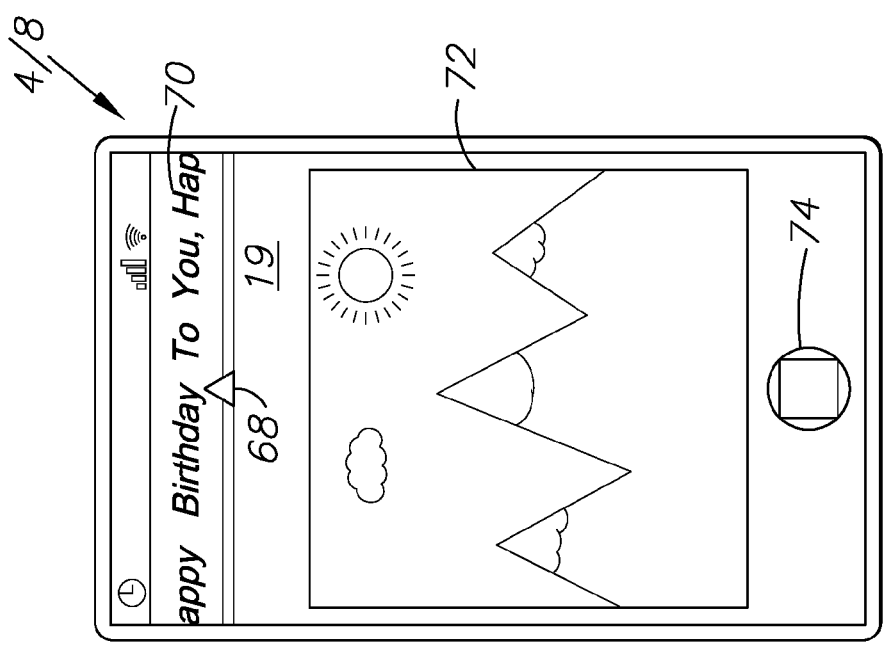
FIG. 8C is a diagrammatic representation of an example of a user interface associated with an embodiment of the present invention.

FIG. 8C is yet another diagrammatic representation of the user interface 19 associated with a participant mobile computing device 4 or a compiler computing device 8. This display features a scrolling lyric bar 70 across the top of the interface, along with a lyric indicator 68 identifying where the selected song is at in its progress. The recording person can view an image of their live recording 72 in the middle of the user interface, and may stop at any time by selecting the "stop" button 74 integrated into the user interface.

The scrolling lyric bar 70 is used to keep all participants at the same speed while singing a greeting, such as the "Happy Birthday" song diagrammed. Otherwise it would be difficult for the software and hardware to synch the video and audio of the participants without distorting the sound.

Once the user selects the stop button, they will be asked whether to review or save the recorded video, or will be provided an option to "start over" and re-record the greeting. This is useful in the instance where a mistake is made in singing the lyrics, for example.

FIG. 8D is yet another diagrammatic representation of a user interface (not labeled) associated with a compiler computing device 8. Here, an invitation screen is shown, including back button 50 and start button 88, which starts the event and sends the invites. The "To" line selects a recipient by selecting the arrow 76 and choosing a recipient from a database of persons located on or accessible by the compiler computing device 8 or, alternatively, manually entering the information. Similarly, the delivery date is selected by selecting the arrow 78 and picking a date from a calendar (not shown) or, alternatively, manually entering the date. The type of greeting is selected by selecting the arrow 80 and choosing from a list of greeting types, or generating one's own greeting type title.

As referenced in the flowchart shown in FIGS. 5A and 5B, the "send early" option 82 may be toggled on or off.

The list of participants is shown at 84. The compiler ("You") is added to the list automatically. The option to "invite more" participants is accessed via the associated button 86, and choosing a participant from a database of persons located on or accessible by the compiler computing device 8 or, alternatively, manually entering the information.

III. Alternative Embodiment Video Greeting System 302

Figure 9:
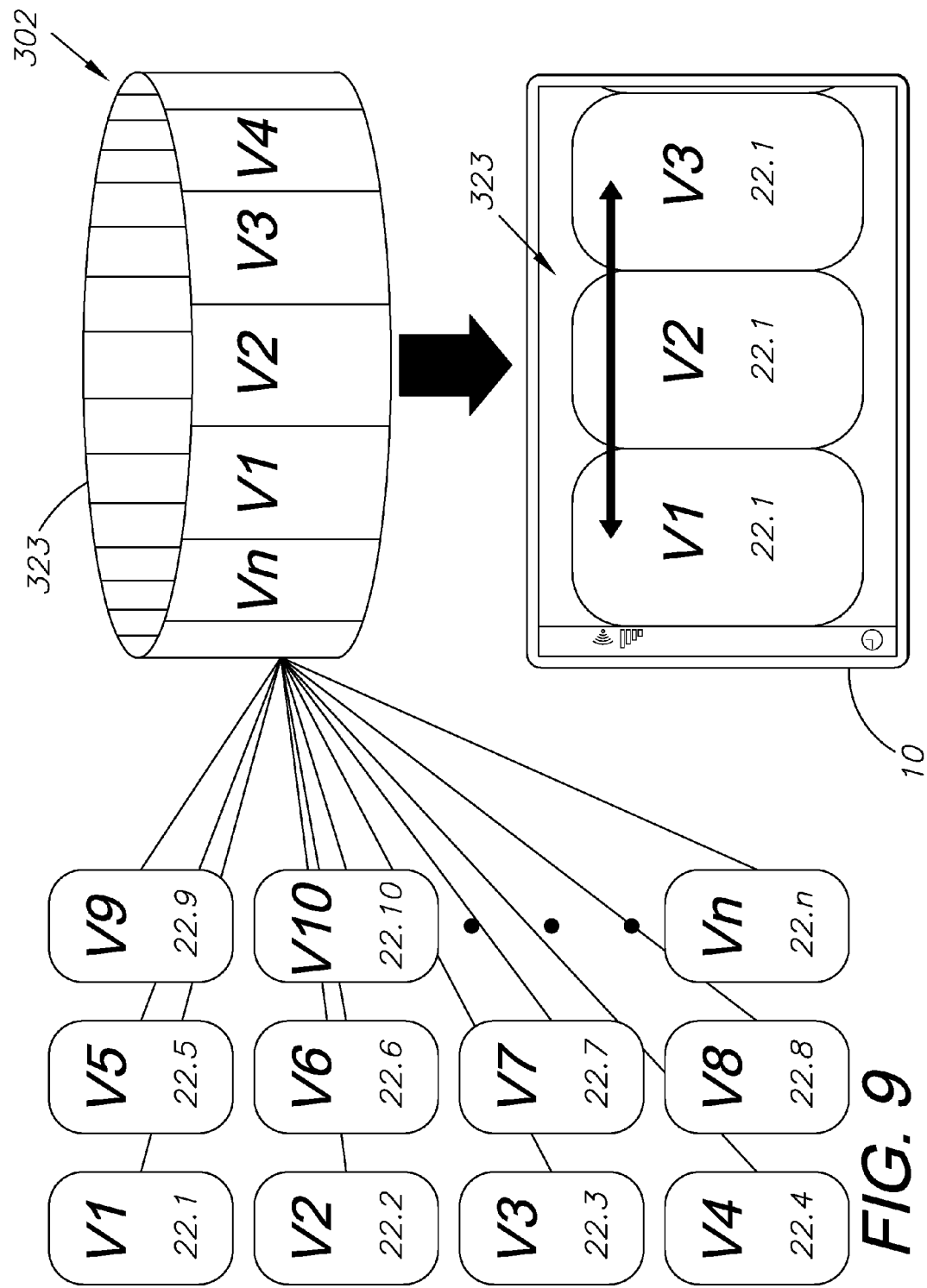
FIG. 9 is a diagrammatic representation of an alternative embodiment video greeting system.

FIG. 9 represents features of an alternative embodiment video greeting system 302. The previous embodiment works well with a limited number of videos which can be viewed and arranged in a grid format on a GUI. However, when dealing with a large number of videos (e.g. more than six), it is difficult to include all videos on a single display and still be able to make out who the participants are in each individual submission.

In FIG. 9, multiple recorded video inputs 22.1, 22.2, 22.3, . . . 22.n are indicated by V1, V2, V3 . . . Vn, where "n" represents any real integer. These videos are stitched together into a single video compilation as described in the method steps outlined above. However, these video inputs are arranged in a final video greeting 323 in a carousel-like arrangement. This allows the recipient to use his or her computing device 10 to scroll through the video inputs individually on the computing device's GUI 44. The arrow shown on the display of the computing device 10 shows that the videos can be flipped through either forwards or backwards. Multiple videos may be played on the screen at a time, as long as the resolution remains high enough to support the videos. The recipient may optionally be able to choose how many videos he can view at once.

The recipient this way will be able to view multiple video submissions in a single video greeting compilation, while also being able to see each individual submission in greater detail.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A computer-implemented method of creating a video greeting, the method comprising the steps:
    accessing a video greeting system with a first computing device, wherein said first computing device comprises a CPU, data storage, and a graphical user interface (GUI), and wherein said video greeting system comprises a central server including a CPU, data storage, and a connection to a computer network;
    initiating a video greeting request with said first computing device;
    generating editing commands at said first computing device, whereby a final video output is generated from at least two video inputs;
    sending said final video output to a second computing device, wherein said second computing device comprises a CPU, data storage, and a GUI;
    displaying said final video output on said second computing device GUI;
    accessing a database of recipients stored in said data storage of said first computing device;
    selecting at least one recipient from said database of recipients;
    sending an invitation through said computer network to a third computing device, wherein said third computing device comprises a CPU, data storage, a GUI, a microphone, and a video camera;
    recording a video input with said second computing device;
    sending a video input from said second computing device to said central server;
    wherein said video input comprises audio data and video data;
    mixing all audio data into a single audio track;
    determining a layout grid based upon said at least two video inputs;
    scaling said video data based upon said layout grid;
    layering said video data onto said layout grid, creating a single layered video; and
    wherein said final video output comprises said single audio track and said single layered video.

2. The method according to claim 1, further comprising the step:
    displaying each said video input on said second computing device separately from said final video output.

3. The method according to claim 1, further comprising the steps:
    wherein said invitation comprises a request to download a software application capable of accessing said video greeting system; and
    downloading said software application to said data storage of said third computing device.

4. The method according to claim 1, further comprising the steps:
    creating a list of invitees;
    declining said invitation with said third computing device;
    sending a decline request from said third computing device; and
    updating said list of invitees based upon said decline request.

5. The method according to claim 1, further comprising the steps:
    wherein said video greeting request comprises a video greeting type including song lyrics;
    displaying and scrolling said song lyrics on said GUI of said third computing device; and
    recording said video input including audio data comprising said song lyrics.

6. The method according to claim 1, further comprising the steps:
    assigning an event date to the video greeting;
    checking to verify a present date; and
    indicating a send status if the present date equals the event date.

7. The method according to claim 6, further comprising the steps:
    setting a send-early status;
    checking to verify that all invitations have been completed; and
    indicating a send status if all invitations have been completed.

8. A video greeting system comprising:
    a central server, a first computing device, a second computing device, and a third computing device, each including a respective CPU, data storage, graphical user interface (GUI), and a connection to a computer network;
    a video greeting request generated by said first computing device;
    an invitation sent from said first computing device through said computer network to said central server, and relayed from said central server though said computer network to said second computing device;
    said second computing device additionally including a microphone, and a video camera;
    at least one video input created by said second computing device, said video input sent from said second computing device through said computer network to said central server;
    video edit commands sent from said first computing device to said central server, said video edit commands altering said at least one video input;
    a final video output generated from said at least one video input and said video edit commands, said final video output sent through said computer network to said third computing device;
    said final video output capable of being displayed on said third computing device GUI;
    a recipient selected from a database of recipients stored in said data storage of said first computing device, said recipient associated with said third computing device;
    a first participant selected from a database of participants stored in said data storage of said first computing device, said first participant associated with said second computing device;

a fourth computing device including a respective CPU, data storage, graphical user interface (GUI), and a connection to said computer network;
a second participant selected from a database of participants stored in said data storage of said first computing device, said second participant associated with said fourth computing device;
said second participant generating a second video input;
each said video input comprising audio data and video data;
a single audio track comprising said audio data;
a layout grid configured from said video data, wherein said video data is scaled to fit said layout grid;
said video data layered onto said layout grid, thereby creating a single layered video; and
wherein said final video output comprises said single audio track and said single layered video.

9. The system of claim 8, further comprising:
a list of invitees generated from said database of invitees;
a decline request sent by said second computing device in response to said invitation; and
said list of invitees updated based upon said decline request.

10. The system of claim 8, further comprising:
a request to download a software application associated with said invitation; and
said software application stored to said data storage of said second computing device.

11. The system of claim 8, further comprising:
a video greeting type associated with said final video output; and
song lyrics displayed on said GUI of said second computing device during recording of said video input.

12. The system of claim 8, further comprising:
an event date assigned to the video greeting;
a present date; and
a send status generated, thereby sending the final video output, if the present date equals the event date.

13. The method according to claim 12, further comprising the steps:
a send-early status;
a determination that all invitations have been completed; and
a send status generated, thereby sending the final video output, upon said determination.

* * * * *